United States Patent [19]

Miller

[11] Patent Number: 4,585,400

[45] Date of Patent: Apr. 29, 1986

[54] APPARATUS FOR DAMPENING PUMP PRESSURE PULSATIONS

[76] Inventor: James D. Miller, P.O. Box 740095, Dallas, Tex. 75374

[21] Appl. No.: 591,681

[22] Filed: Mar. 21, 1984

Related U.S. Application Data

[63] Continuation-in-part of Ser. No. 401,959, Jul. 26, 1982, Pat. No. 4,445,829, which is a continuation-in-part of Ser. No. 216,161, Dec. 15, 1980, abandoned.

[51] Int. Cl.$^4$ .......................................... F04B 11/00
[52] U.S. Cl. .................................. 417/540; 137/568; 138/30; 383/119
[58] Field of Search ............... 417/540, 541, 542, 543, 417/544; 137/568; 138/26, 28, 30; 273/65 B; 383/119; 92/102, 103 F

[56] References Cited

U.S. PATENT DOCUMENTS

| | | | |
|---|---|---|---|
| 888,833 | 5/1908 | Miller | 417/540 |
| 1,703,143 | 2/1929 | Greve | 417/543 |
| 2,094,457 | 9/1937 | Lattner | 137/78 |
| 2,347,379 | 11/1942 | Teeter | 138/30 |
| 2,530,190 | 12/1945 | Carver | 138/26 |
| 2,858,090 | 10/1958 | Winzen et al. | 383/119 |
| 3,168,887 | 2/1965 | Bodell | 383/119 |
| 3,204,568 | 9/1965 | Grossfield | 92/103 F |
| 3,486,530 | 9/1966 | Mercier | 138/30 |
| 4,032,265 | 6/1977 | Miller | 417/540 |

FOREIGN PATENT DOCUMENTS 1092262 11/1960 Fed. Rep. of Germany ........ 138/30

Primary Examiner—Carlton R. Croyle
Assistant Examiner—Dnald E. Stout
Attorney, Agent, or Firm—Hubbard, Thurman, Turner, & Tucker

[57] ABSTRACT

A pressure pulsation dampener for use in connection with positive displacement reciprocating piston pumps comprising a spherical pressure vessel having opposed inlet and outlet ports arranged along a diametral line of the vessel sphere and having a generally cylindrical flexible tubular member forming part of a replaceable cartridge disposed within the interior chamber of the spherical pressure vessel. The liquid volume capacity of the spherical pressure vessel is sufficient to reduce to the flow velocity of the liquid entering the vessel by approximately 85%. A flexible elastomeric tubular member is provided with encapsulated longitudinally extending reinforcing cords which are of a generally curved shaped and of a length longer than the length of the flexible member. Upon inflation of the flexible member the cords ultimately come under tension to limit the expansion or distention of the flexible member and to absorb the stress imposed on the flexible member under the maximum distended condition. The flexible member is effective to dampen flow induced pressure pulsations over a wide range of nominal working pressures.

16 Claims, 9 Drawing Figures

APPARATUS FOR DAMPENING PUMP PRESSURE PULSATIONS

CROSS REFERENCE TO RELATED APPLICATIONS

This application is a continuation-in-part of U.S. patent application Ser. No. 401,959, filed: July 26, 1982, now U.S. Pat. No. 4,445,829, which is a continuation-in-part of application Ser. No. 216,161, filed Dec. 15, 1980, now abandoned.

BACKGROUND OF THE INVENTION

Field of the Invention

This invention pertains to apparatus for reducing pressure pulsations in liquid conduit systems connected to positive displacement pumps comprising a cartridge disposed in a chamber formed by a closed pressure vessel and including a unique flexible and expandable gas filled member.

Background

My prior patent applications referenced herein are directed to improvements in apparatus for dampening pump pressure pulsations caused by flow variations in a transmission line downstream of a pump discharge manifold and also secondary pressure pulsations resulting from the acceleration of the liquid by the pump apparatus. These secondary or residual pulsations are particularly difficult to attenuate in systems wherein a vertical static head is imposed on the pump at all times by an effective column of fluid in the pump discharge line. Although, my prior applications discuss several parameters, in the provision of a suitable pressure pulsation dampening device, which must be adhered to in order to deal effectively with reducing the flow induced pressure pulsations as well as acceleration induced pressure pulsations, there are additional considerations which must be dealt with in many pulsation dampening applications.

In many applications of pulsation dampening apparatus, if not essentially all applications, it is desirable to minimize or eliminate the gas-liquid interface by providing a gas volume chamber within the pulsation dampener which is enclosed by a member made of a suitable flexible and/or distendable material. By enclosing the gas volume chamber, absorbtion of the gas charge by the liquid flow through the dampener is eliminated and the configuration of the pulsation dampener structure itself is allowed an added measure of versatility in design. On the other hand if the gas volume chamber is provided by a flexible enclosure or bladderlike structure certain problems associated with stress on this structure and the degree of expandability of the structure which can be tolerated using conventional engineering materials become limiting factors. Accordingly, the range of pressure pulsations which may be treated with a particular pulsation dampener design have been somewhat limited with prior art pulsation dampener apparatus.

Several factors are important in the provision of a suitable pressure pulsation dampener adapted for minimizing the transmission of flow induced pressure pulsations as well as acceleration induced pressure pulsations in pump discharge conduit systems. It is important to minimize the stress on the pressure vessel defining the pressure pulsation dampener itself. In accordance with the teachings of my prior patent applications and patent it is also important to substantially reduce the liquid flow velocity through the dampener and it is important to position a flexible cartridge type gas volume containing vessel in such a way that it is aligned with the dampener inlet and outlet conduits without being impinged directly by high velocity liquid flows into the dampener itself.

Another factor which is of considerable importance in the design of a pump pressure pulsation dampener is the provision of a cartridge which is easily inserted in and removed from a pressure vessel and defines a flexible member forming a closed gas volume chamber which is capable of expanding and contracting over a relatively wide range of volumes without unduly stressing the member defining the gas volume chamber. It is important to allow the flexible member to expand and contract over a relatively wide range without contacting a protective shell structure or without contacting the walls of the liquid pressure vessel itself. It is, in fact, desirable to eliminate the shell enclosure associated with prior art bladder type gas volume enclosures to thereby eliminate the prospects of early failure of the flexible member from repeated contact with the shell structure in the presence of an abrasive fluid.

The provision of a bladder containing shell structure in prior art pulsation dampeners has been considered a necessity to prevent overexpansion of the bladder. However, deterioration of the bladder from repeated contact with the protective shell structure itself, particularly in the presence of abrasive fluids, usually offsets any advantage gained from the provision of the shell structure. Moreover, for pulsation dampeners exposed to relatively wide ranges of peak to peak pressure pulsations, prior art configurations of liquid pressure vessels and structure for confining the gas volume have not been able to overcome early failures of the gas volume containing structure and also meet the criteria for effectively reducing flow induced as well as acceleration induced pressure pulsations. To this end the present invention has been developed with a view to carrying forward the teachings of my prior patent referenced above as well as providing unique improvements in pressure pulsation dampeners which have heretofore been unrecognized and unappreciated in the art.

SUMMARY OF THE INVENTION

The present invention provides an improved pressure pulsation dampener for hydraulic systems utilizing positive displacement pumps wherein pressure fluctuations in the discharge line of such pumps are reduced to minimize damaging vibrations. In accordance with one aspect of the invention there is provided a pulsation dampener which is adapted to minimize flow induced pressure pulsations as well as pressure pulsations of a secondary or residual nature and which are believed to be induced by acceleration and deceleration of liquid in a pump discharge conduit system during the delivery stroke of, for example, a reciprocating plunger type pump.

In accordance with another aspect of the present invention there is provided a pump discharge pressure pulsation dampener comprising a pressure vessel adapted for receiving a cartridge defined in part by a flexible member adapted to be filled with a compressible gas and disposed within a liquid volume chamber in the pressure vessel wherein a predetermined liquid volume is provided, and further wherein the range of gas volumes may be greater than has been possible for prior art pulsation dampeners.

The desired characteristics for a pump discharge pressure pulsation dampener have been realized in accordance with the present invention by the provision of a generally spherical pressure vessel or tank defining the liquid volume and supporting a replaceable cartridge having a flexible expandable member or secondary pressure vessel within the interior of the liquid pressure vessel and defining a gas volume chamber which is expandable and contractible to accommodate substantial variations in fluid flow through the pulsation dampener and to minimize the transmission of flow induced as well as acceleration induced pressure pulsations.

In accordance with yet a further aspect of the present invention there is provided a spherical type pressure pulsation dampener for use in conjunction with the discharge flow conduit for a reciprocating plunger pump wherein both inlet and outlet openings for the liquid flow through the pulsation dampener are aligned with each other and are also centered on a diametral axis of a generally spherically shaped liquid pressure vessel. The provision of a generally spherical pressure vessel minimizes the requirements for vessel wall thickness for a given maximum stress to be tolerated in the pressure vessel and the location of the liquid inlet and outlet openings with respect to the interior liquid volume chamber of the pressure vessel maximizes the distance between the inlet and outlet openings as well as the distance between the respective inlet and outlet openings and a cartridge comprising a flexible gas filled member forming a pressure vessel disposed within the liquid volume chamber of the pulsation dampener itself.

In accordance with still a further aspect of the present invention there is provided a pressure pulsation dampener for use in conjunction with a discharge conduit system for a reciprocating plunger pump wherein the average fluid velocity through the pulsation dampener is substantially reduced, particularly in the vicinity of a flexible gas filled cartridge structure disposed in the liquid pressure vessel.

In accordance with yet a further aspect of the present invention there is provided a pressure pulsation dampener having a gas filled member disposed within a liquid volume chamber of the pressure vessel and which is characterized by a generally elongated cylinder in a relaxed condition but which may be expanded into a generally spherical shape within the pressure vessel liquid volume chamber. The flexible and expandable gas filled member is reinforced with a plurality of elongated flexible reinforcing cords or cables extending longitudinally with respect to the length axis of the member but which, in the relaxed or contracted state of the member, have a curved portion forming a generally U-shaped configuration through a central section of the member. The arrangement of the reinforcing cords provides for considerable expansion or distention of the cylindrical member before the reinforcing cords are placed in tension whereby the member is limited in its maximum distention by internal reinforcing and stretch limiting structure and whereby the member itself is relatively free to expand or contract over a relatively large volume range. The internal reinforcing and stretch limiting structure of the flexible tubular member also advantageously permits the elimination of a protective shell or enclosure for the cartridge thereby eliminating a source of wear and early failure of bladder or gas volume defining vessels associated with prior art type pressure pulsation dampeners.

Those skilled in the art will further appreciate the abovementioned features and advantages of the present invention as well as other superior aspects of the invention upon reading the following description in conjunction with the drawing.

DESCRIPTION OF THE PREFERRED EMBODIMENT

Figure 1:
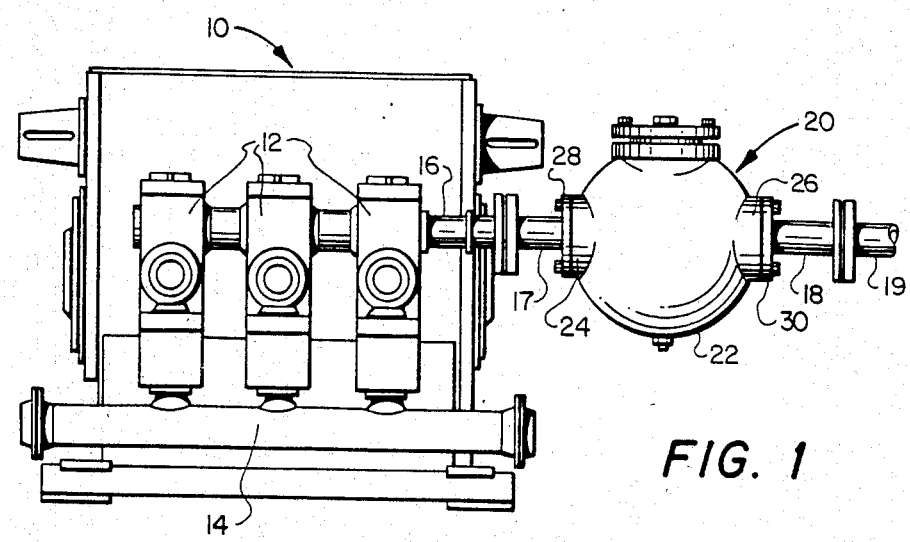
FIG. 1 is a front elevation of a reciprocating piston pump having a pressure pulsation dampener in accordance with the present invention interposed in the pump discharge conduit.

In the description which follows like parts are marked throughout the specification and the drawing with the same reference numerals, respectively. The drawing figures are not necessarily to scale and certain features of the invention may be exaggerated in scale or shown in somewhat schematic form in the interest of clarity.

Referring to FIG. 1 there is illustrated in front elevation a so-called triplex type reciprocating piston pump, generally designated by the numeral 10. The pump 10 may be one of several types known in the art of high pressure multi-cylinder reciprocating pumps and, for example, may be a type A600-PT manufactured under the trademark Wilson-Snyder and referenced in my prior co-pending patent. The pump 10 includes at least three parallel in-line fluid ends 12 connected to a liquid inlet conduit or manifold 14 and also interconnected to form a discharge flow conduit 16. The conduit 16, including extensions thereof and designated by the numerals 17, 18 and 19, is adapted to receive cyclical liquid flow from the respective pumping chambers, not shown, of the fluid ends 12 for conducting liquid to a point of end use. Typically, the pump 10 is used for pumping fluid against a static discharge head caused by a vertical change in elevation of the discharge line between the pump and the final point of discharge of liquid from the conduit 16-19. In accordance with the teachings of my prior co-pending patent it has been determined that the provision of a pressure pulsation dampener interposed in the discharge conduit directly downstream of the pump itself is highly advantageous in reducing the flow induced pressure pulsations as well as pressure pulsations due to acceleration and deceleration of the liquid flow in the discharge conduit system.

In accordance with the present invention an improved pressure pulsation dampener apparatus is provided in the discharge conduit 16-19 and is generally designated by the numeral 20 in FIG. 1. The pulsation dampener apparatus 20 comprises a generally spherical cast steel pressure vessel 22 having opposed circular bosses 24 and 26 to provide for interposing the apparatus in the discharge conduit by forming flanged connections between the conduit sections 17 and 18 which are provided with conventional cylindrical pipe flanges 28 and 30. The flanges 28 and 30 are typically provided with clearance holes arranged in a circular pattern for accommodating threaded bolts 31 whereby the flanges may be secured to the bosses 24 and 26.

Figure 2:
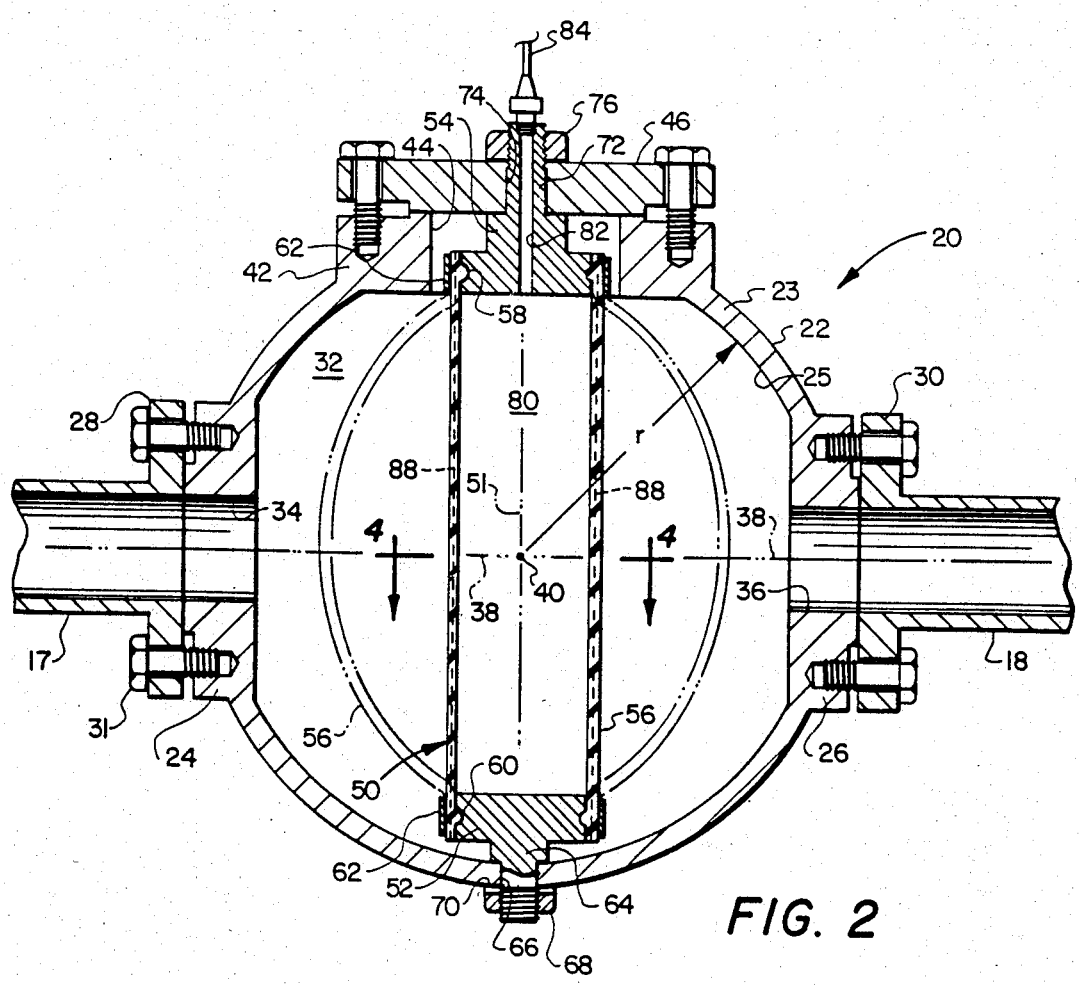
FIG. 2 is a vertical central section view of the pulsation dampener illustrated in FIG. 1.

Referring also to FIG. 2 the pressure vessel 22 defines an interior liquid volume chamber 32 which is of a generally spherical shape and is in communication with fluid inlet and outlet ports 34 and 36, respectively. The ports 34 and 36 are formed in the respective bosses 24 and 26 and are coaxial with a diametral axis 38 passing through the center 40 of the sphere defining the pressure vessel 22. Accordingly, the pressure vessel 22 is defined generally by a spherical wall 23 having an inner surface 25 of radius r. The spherical inner wall surface 25 defining the liquid volume chamber 32 is interrupted at the bosses 24 and 26 and at a third boss 42 of generally cylindrical configuration and forming an opening 44 therein for access to the liquid volume chamber 32 upon removal of a closure flange 46.

The pulsation dampener 20 is also provided with means defining an enclosed gas volume chamber and comprising a generally cylindrical elongated cartridge, generally designated by the numeral 50 in FIG. 2. The cartridge 50 includes opposed head members 52 and 54 between which extends a generally cylindrical flexible tubular sleeve type member 56. The member 56 is preferably formed of a flexible and stretchable or expandable material such as synthetic rubber or a similar elastomer. The member 56 is typically provided with annular integrally molded bead portions 58 and 60 at opposite ends thereof which are fitted in cooperating grooves formed in the heads 52 and 54 to form a fluid tight seal at the juncture of the member 56 with the respective heads. The member 56 is also secured to the respective heads 52 and 54 by suitable band clamps 62, for example. The head 52 includes a reduced diameter portion 64 which is threaded on its distal end and projects through a bore 66 formed in the wall of pressure vessel 22. The head 52 is secured in the position shown in FIG. 2 by a locknut 68 having a resilient gasket seal 70 interposed between itself and the outer surface of the pressure vessel wall. The head member 54 is also provided with a reduced diameter portion 72 projecting through a bore 74 formed in the flange 46 and secured in assembly therewith by a locknut 76. As illustrated in FIG. 2, the cylindrical opening 44 in flange 42 is of sufficient diameter to provide for inserting and removing the cartridge 50 with respect to the liquid volume chamber 32.

The cartridge 50 defines a gas volume chamber 80 between the tubular member 56 and the opposed head members 52 and 54. The chamber 80 may be charged with pressure gas through a passage 82 formed in the head member 54 and which is connected to a suitable conduit 84 in communication with a source of pressure gas, not shown. Once an initial charge of gas at a predetermined pressure is placed in chamber 80 the conduit 84 may be closed or disconnected from the abovementioned source. The member 56 is operable to expand or distend into a generally spherical shape as indicated by the alternate position lines in FIG. 2. The cartridge 50 is also preferably oriented such that its longitudinal axis 51 is coincident with a diametral axis of the spherical pressure vessel 22 and passing through the axis center 40 as indicated in FIG. 2. In this way, when the member 56 is expanded or distended into its alternate positions, a generally uniform flow area is formed between the member 56 and the interior wall surface 25 of the pressure vessel 22.

Figure 3:
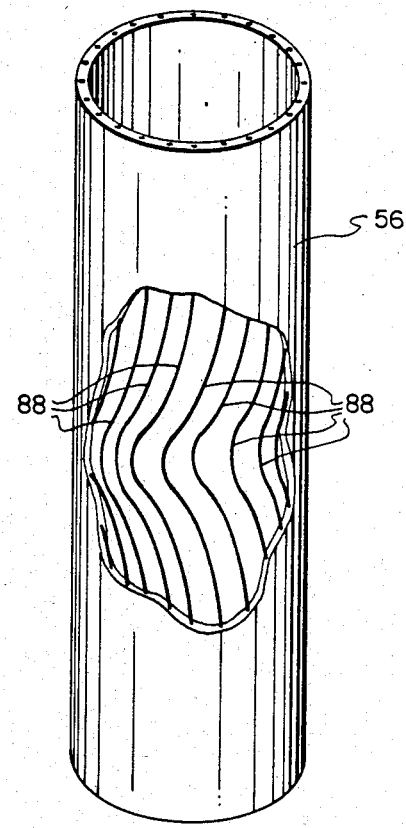
FIG. 3 is a perspective view, partially broken away, of the cylindrical tubular gas volume containing member or pressure vessel.
Figure 4:
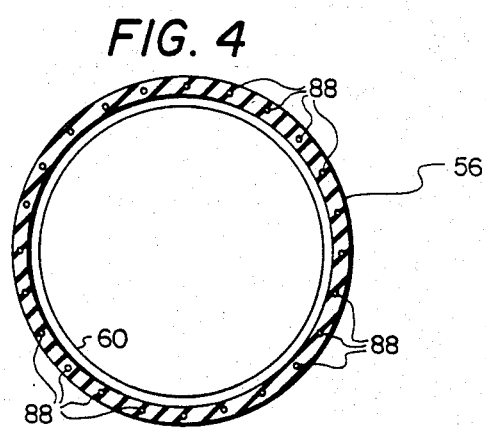
FIG. 4 is a section view taken along 4—4 of FIG. 2.
Figure 5:
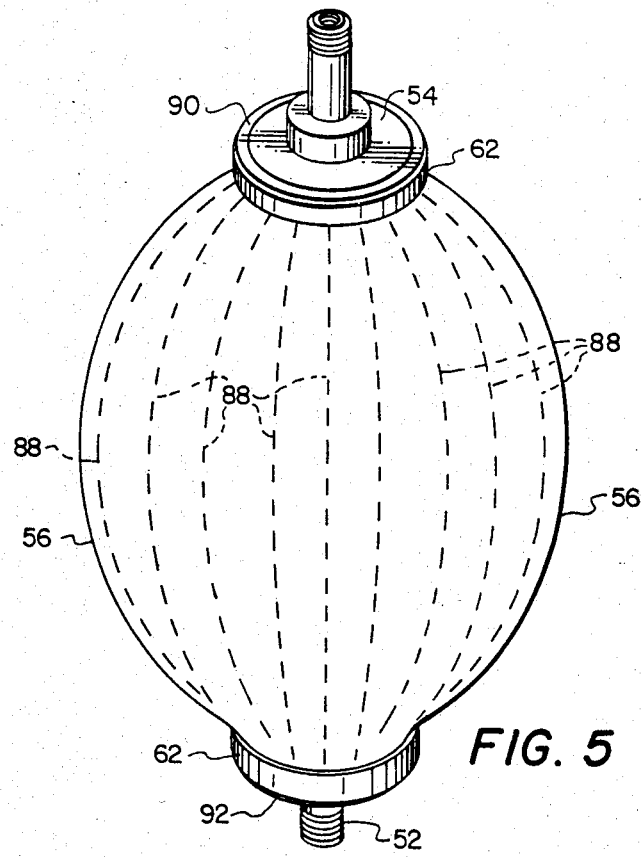
FIG. 5 is a perspective view of the gas volume containing cartridge member in an expanded or distended condition and illustrating the configuration of the reinforcing cords.
Figure 6:
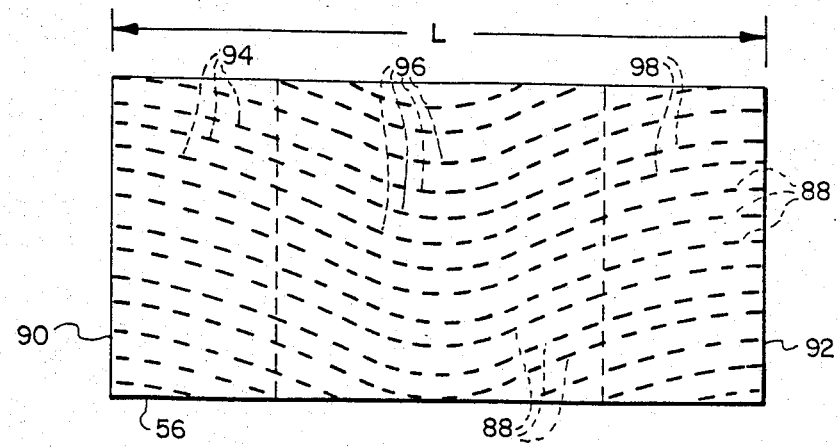
FIG. 6 is a planar development of the tubular cartridge member shown in FIG. 3.

Referring now to FIGS. 3 through 6 also, the member 56 is provided with means for limiting its distention or expansion and for bearing a substantial portion of the stress on the bladder member 56 once it reaches its expanded limit position. In accordance with the present invention the bladder sleeve member 56 is preferably provided with a plurality of generally longitudinally extending reinforcing cords 88 which are integrally molded or encapsulated within the wall thickness of the member 56, as indicated in FIG. 4. As indicated in FIGS. 3 and 6, the cords 88 extend substantially longitudinally from the end 90 of the member 56 to the end 92 but, in the plan view of the unrolled or developed member 56 illustrated in FIG. 6, undergo a reverse curvature formed from a first curved section 94, a second reversely curved section 96 and a third curved section 98 having a generally mirror image curvature of the section 94. The cords 88 are thus of greater length in their relaxed condition than the overall length L of the member 56. Accordingly, when the member 56 is secured at its opposite ends 90 and 92 to the head members 52 and 54 in the manner shown in FIG. 2, the cords 88 will permit relatively unrestricted expansion or distention of the member until the cords themselves assume a generally spherical configuration arranged not unlike equal spaced longitudinal lines of curvature, as indicated in FIG. 5.

When the cords 88 assume the position illustrated in FIG. 5 they become operable to prevent substantial further expansion of the member 56 and thereby bear a substantial portion of the stresses imposed on the member 56. However, between the position shown in FIG. 5 and the generally relaxed position of the cords 88 illustrated in FIGS. 3 and 4, the cords allow the member 56 to expand and contract under its own elasticity and the cords bear little of the stress imposed on the elastomeric material of the member 56 but permit relatively free expansion and contraction thereof. The cords 88 may be formed of one of several materials and constructions suitable for generally flexible cablelike members including stranded wire rope of metal and nonmetal compositions. The circumferential spacing of the cords 88 may vary with the wall thickness of the member 56 and its tensile strength for the operating conditions to which the cartridge 50 is subjected. Moreover, the flexibility of the cords 88 will affect the specific shape of the member 56 in its distended condition.

Referring briefly to FIG. 6, it will be noted that the curved segments 94 and 98 of the cords 88 extend over approximately 30% each of the length L of the member 56, and the intermediate curved segment 96 of opposite curvature extends over the remaining 40% of the length L. When the member 56 is expanded to commence straightening of the cords 88 to form a generally curved line lying in a plane passing through the axis 51, the elastomeric material of the member 56 will undergo some lateral as well as radial distortion as the cords begin to approach their tensioned condition indicated in FIG. 5. However, this distortion of the member 56 is less stressful on the elastomeric material than would be encountered if the member 56 were allowed to expand without the benefits of the presence of the cords themselves.

The provision of the cartridge 50 provides for dampening pressure pulsations over a broader range of working pressures than is possible with prior art type pulsation dampeners. Although, the pulsation dampener 20 enjoys the benefits associated with the parameters described in my above referenced patent, the cartridge 50 may be precharged with pressure gas at a substantially lower initial precharge pressure and thereby be operable to reduce the peak to peak pressure pulsations sensed in the discharge line 16–19 of the pump 10 for a wider range of working pressures in the discharge line.

Figure 8:
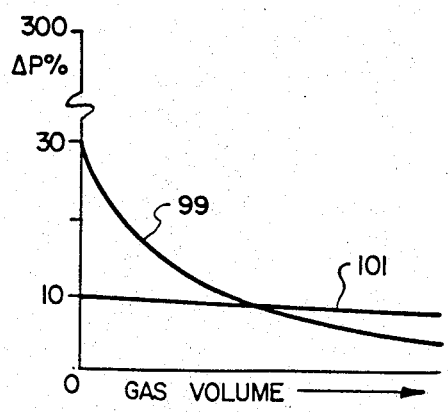
FIGS. 8 and 9 are diagrams showing, respectively, the relative effect of gas volume and liquid volume of a pressure pulsation dampener on flow induced and acceleration induced pressure pulsations.
Figure 9:
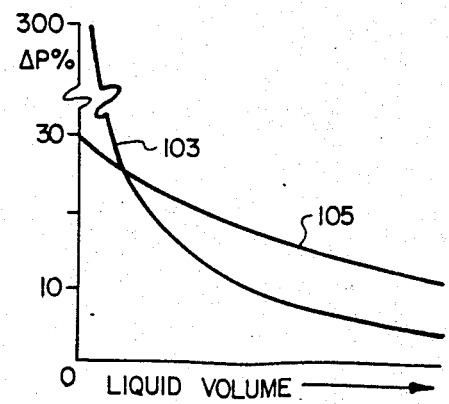

Referring briefly to FIGS. 8 and 9 there are illustrated, respectively, diagrams showing the general effect of the gas volume and the liquid volume of a pressure pulsation dampener, such as the dampener 20, on the peak to peak pressure pulsations resulting from flow and acceleration induced pulsations in the discharge conduit system of a triplex reciprocating piston pump, for example. In FIG. 8, the curve 99 represents the peak to peak flow induced pressure pulsations as a percent of the nominal working pressure for increasing gas volume in a pressure pulsation dampener located in the discharge conduit of a triplex reciprocating piston pump immediately downstream of the pump fluid end. The curve 101 represents the effect of increasing gas volume of a pulsation dampener on the acceleration induced pressure pulsations. In FIG. 9 the curve 103 represents the variation in acceleration induced pressure pulsations observed in the discharge line of a reciprocating piston pump and the effect thereon of increasing liquid volume of a pressure pulsation dampener. The curve 105 represents the effect of increasing liquid volume on the flow induced pressure pulsations as a percent of nominal working pressure. It is clear from the diagram of FIG. 8 that the gas volume of a pulsation dampener has a profound effect on flow induced pressure pulsations whereas the total gas volume of a pressure pulsation dampener has a relatively insignificant effect on the acceleration induced pressure pulsations. On the other hand, as indicated in FIG. 9, the effect of total liquid volume in the pressure pulsation dampener has a significant effect on reducing the acceleration induced pressure pulsations but contributes less significantly to reducing the flow induced pressure pulsations.

Figure 7:
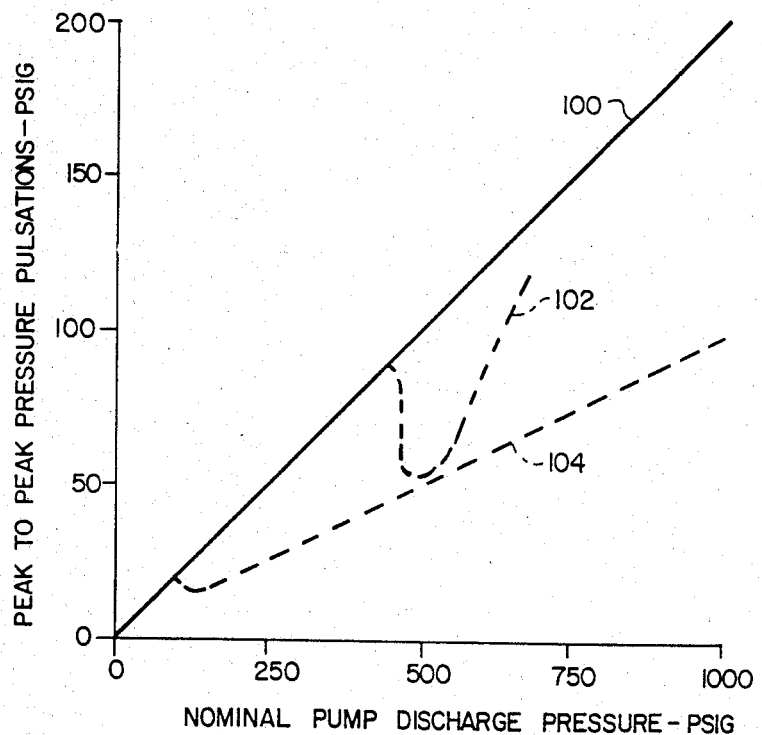
FIG. 7 is a diagram showing the pressure pulsation dampening characteristics of the present invention.

Referring now to the diagram of FIG. 7, there is illustrated a graphical plot of the peak to peak pressure pulsation magnitude for a triplex type reciprocating plunger pump for a range of nominal working pressures in the pump discharge line. The straight curve 100 in FIG. 7 represents generally the pressure pulsations which would be experienced with no pulsation dampener in the discharge line over a range of nominal pump discharge pressures from 0 PSIG to 1000 PSIG. The curve 102 represents the peak to peak pressure pulsations experienced in the discharge line 16–19 using a non-expanding reinforced flexible cartridge as described in my above referenced patent or a structure which is incapable of distention to occupy a larger volume in the interior of the pulsation dampener and precharged with pressure gas at a nominal pressure of approximately 450 PSIG. Accordingly, for nominal pump discharge working pressures less than 450 PSIG. there is essentially no pulsation dampening provided by such a dampener. However, with the provision of the member 56 which is suitably flexible and is precharged with pressure gas at a nominal pressure of only 90 PSIG, for example, the pulsation dampening characteristics of the pulsation dampener 20 are according to the curve 104 in FIG. 7. The curve 104 indicates clearly that the pulsation dampener 20 is operable to reduce the peak to peak pressure pulsations over a substantial range of nominal working pressures to approximately 50% of what which would be experienced with no pulsation dampener for working pressures between approximately 100 PSIG and 1,000 PSIG, for example.

Another advantage of the configuration of the bladder member 56 is that the bladder may be allowed to expand to a greater degree thereby increasing the gas volume as a percentage of the total volume of the chamber 32. When the gas volume of a pressure pulsation dampener increases as a percentage of the total volume of the pulsation dampener interior chamber a much greater dampening effect is accomplished with respect to dampening flow induced pressure pulsations as compared with the dampening of flow induced pressure pulsations resulting from an increase in the liquid volume of the pulsation dampener. In other words, if the total volume of the pulsation dampener chamber, considered to be the chamber 32 in the pulsation 20, is a liquid volume then flow induced pressure pulsations are not significantly reduced as compared with the reduction in flow induced pressure pulsations which is accomplished by increasing the pulsation dampener volume occupied by the member 56 as a percent of the of the total pulsation dampener volume. Accordingly, if the gas volume of the chamber 32 is allowed to increase by providing a structure such as the member 56 which may expand to occupy a substantial portion of the total volume, flow induced pressure pulsations can be attenuated over a relatively wide range of nominal working pressures.

Thanks to the configuration of the expandable member 56 a greater degree of expansion from a relaxed condition can be provided without the prospect of structural failure than with prior art flexible pulsation dampener bladders or diaphragm structures. In fact, in a nominal 400 gallon capacity pressure pulsation dampener, that is a pulsation dampener wherein the total volume of the interior chamber 32, referring to the embodiment of FIG. 2, is 400 gallons, a cartridge 50 can be provided wherein the member 56 is expandable to occupy approximately 50% of the volume of chamber 32, wherein the interior chamber 80 has a volume of approximately 200 gallons. This expansion may be provided without the risk of over distention of the member 56 at relatively low pressure conditions in the chamber 32, the member 56 is restrained from contact with the interior wall surface 25 and does not require a containment cage as with conventional prior art type pulsation dampeners.

A pulsation dampener constructed in accordance with the embodiment described in conjunction with FIGS. 1 through 6 may adhere to the parameters which provide for improved dampening of flow induced pulsations as well as acceleration induced pulsations. The flow velocity of liquid should be reduced by approximately 85% or more from the velocity in the discharge conduit 16–19, the interior volume of the pressure vessel 22 should be in the range of approximately 5% to 10% of the discharge liquid flow rate through the pulsation dampener wherein the units of volume of the liquid volume chamber and the flow rate are the same and the unit of time of the flow rate is one minute, and the volume occupied by the interior chamber 80 of the member 56 should range from 5% to 20% of total volume of the chamber 32. However, in applications wherein the flow induced pressure pulsations are particularly significant, (such as in duplex or single cylinder pumps) the gas volume should be allowed to occupy as much as 50% of the volume of the chamber 32.

Although, a preferred embodiment of a pressure pulsation dampener in accordance with the present invention has been described herein in detail those skilled in the art will appreciate that various substitutions and modifications may be made to the invention without departing from the scope and spirit thereof as recited in the appended claims.

What I claim is:

1. A pressure pulsation dampener for reducing hydraulic pressure pulsations in the discharge flow line of a positive displacement pump, comprising:

a generally spherical pressure vessel forming an enlarged volume chamber, said pressure vessel including an inlet port adapted to be connected to pump discharge conduit means and a discharge port adapted to be connected to a hydraulic flow line whereby said dampener is interposed in the pump discharge flow line, said pressure vessel having a volumetric capacity of at least 5% of the discharge liquid flow rate through the dampener wherein the units of volume of the capacity of said pressure vessel and liquid flow are the same and the unit of time is one minute, and means containing a trapped volume of pressure gas comprising a gas charged flexible cartridge disposed in said pressure vessel, said cartridge comprising a flexible member forming an interior chamber having a gas volume of at least 5% of the liquid volume of said pressure vessel, said flexible member being formed of a fluid impervious elastomeric material which is stretchable under the urging of pressure gas in said interior chamber, said flexible member including means for limiting the stretching of said elastomeric material to provide a predetermined shape of said flexible member when stretched by said pressure gas in said interior chamber, said means for limiting said stretching comprising means for allowing said flexible member to assume a generally spherical shape when stretched under the urging of said pressure gas, including a plurality of flexible cords encapsulated in said elastomeric material, said cords being arranged to be relaxed between a relaxed condition of said flexible member and a predetermined stretched condition of said flexible member and to be tensioned under the urging of pressure gas acting on said elastomeric material at a predetermined stretched condition of said flexible member to limit the expansion of said flexible member under the urging of said pressure gas.

2. The pulsation dampener set forth in claim 1 wherein:

said pressure vessel is proportioned so as to provide for reducing the liquid flow velocity entering said pressure vessel approximately 85% or more from the velocity in said pump discharge conduit means.

3. The pulsation dampener set forth in claim 2 wherein:

said ports are aligned with each other on a diametral axis of said pressure vessel.

4. The pulsation dampener set forth in claim 1 wherein:

said cords extend generally longitudinally between opposite ends of said flexible member and are formed with a generally U-shaped curved mid portion between said ends when said flexible member is in a relaxed condition of said elastomeric material.

5. The pulsation dampener set forth in claim 4 wherein:

said cords are arranged spaced apart around the circumference of said flexible member and extend generally from one end of said flexible member to the other end of said flexible member.

6. The pulsation dampener set forth in claim 1 wherein:

said cartridge includes opposed head members secured to opposite ends of said flexible member, said head members including means for securing said flexible member in said enlarged chamber in said pressure vessel.

7. The pulsation dampener set forth in claim 6 wherein:

said head members each include stem portions projecting through respective openings formed in said pressure vessel and are secured to said pressure vessel by threaded fastener means.

8. The pulsation dampener set forth in claim 6 wherein:

one of said head members includes passage means for injecting pressure gas into the interior chamber of said cartridge.

9. The pulsation dampener set forth in claim 6 wherein:

said pressure vessel includes a boss having an opening therein into said enlarged chamber for insertion and removal of said cartridge with respect to said pressure vessel and a flange covering said opening and adapted to be connected to one of said head members.

10. The pulsation dampener set forth in claim 1 wherein:

the longitudinal central axis of said flexible member is normal to a diametral axis of said pressure vessel.

11. A pressure pulsation dampener for reducing pressure pulsations in a hydraulic conduit comprising:

a closed pressure vessel interposed in said conduit and forming an enlarged volume chamber, said pressure vessel including fluid inlet and discharge ports adapted to be connected to said conduit; and a gas charged flexible member disposed in said pressure vessel defining an interior chamber and formed of a fluid impervious elastomeric material which is stretchable under the urging of pressure gas in said interior chamber, said flexible member including means encapsulated by said elastomeric material for limiting the stretching of said elastomeric material to provide a predetermined shape of said flexible member when stretched by said pressure gas in said interior chamber, said means for limiting said stretching comprises a plurality of flexible cords embedded in said elastomeric material, said cords being arranged to be generally relaxed between a relaxed condition of said flexible member and a predetermined stretched condition of said flexible member and to be tensioned under the urging of pressure gas acting on said flexible member at a predetermined stretched condition of said flexible member to limit the expansion of said flexible member under the urging of said pressure gas.

12. The pulsation dampener set forth in claim 11 wherein:
said flexible member comprises a generally cylindrical tubular sleeve and said cords extend generally longitudinally between opposite ends of said flexible member and are formed with a generally U-shaped curved mid portion between said ends when said flexible member is in a relaxed condition of said elastomeric material.

13. The pulsation dampener set forth in claim 12 wherein:
said cords are arranged spaced apart around the circumference of said flexible member and extend generally from one end of said sleeve to the other end of said sleeve.

14. The pulsation dampener set forth in claim 12 wherein:
said pressure vessel is generally spherical in shape and said flexible member is disposed generally along a diametral line of said pressure vessel and is distendable into a generally spherical shape under the urging of said pressure gas.

15. The pulsation dampener set forth in claim 14 wherein:
said flexible member is distendable to provide an interior chamber volume of about 50% of the volume of said enlarged volume chamber.

16. A pressure pulsation dampener for reducing hydraulic pressure pulsations in the discharge flow line of a positive displacement pump, comprising:
a pressure vessel having a wall defining an enlarged volume chamber, said pressure vessel including an inlet port adapted to be connected to pump discharge conduit means and a discharge port adapted to be connected to a hydraulic flow line whereby said dampener is interposed in the pump discharge flow line and is operable to conduct fluid through said enlarged volume chamber between said ports; and means containing a trapped volume of pressure gas comprising a gas charged flexible cartridge disposed in said pressure vessel, said cartridge comprising a flexible member forming an interior chamber having a gas volume of at least about 5% of the liquid volume of said pressure vessel, said flexible member being formed of an elastomeric material which is stretchable under the urging of pressure gas in said interior chamber, said flexible member including means for limiting the stretching of said elastomeric material to provide a predetermined maximum gas volume of said interior chamber and to restrain said flexible member from engagement with said wall of said pressure vessel defining said enlarged volume chamber, said flexible member including a generally elongated flexible tube; and said means for limiting said stretching comprises a plurality of flexible cords embedded in said elastomeric material, said cords being arranged to be extended generally longitudinally of said tube and to be generally relaxed between a relaxed condition of said flexible member and a predetermined stretched condition of said flexible member and to be tensioned under the urging of pressure gas acting on said flexible member at a predetermined stretched condition of said flexible member to limit the expansion of and determine the shape of said flexible member under said predetermined stretched condition.

* * * * *